(12) United States Patent
Gunnarsson et al.

(10) Patent No.: US 8,583,974 B2
(45) Date of Patent: Nov. 12, 2013

(54) METHODS AND ARRANGEMENTS FOR HOLDING TARGET RATIO FOR POWER LOOP IN A WIRELESS COMMUNICATION SYSTEM

(75) Inventors: Fredrik Gunnarsson, Linköping (SE); Johan Bergman, Kista (SE); Eva Englund, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 440 days.

(21) Appl. No.: 12/741,735

(22) PCT Filed: Oct. 2, 2008

(86) PCT No.: PCT/SE2008/051118
§ 371 (c)(1),
(2), (4) Date: May 6, 2010

(87) PCT Pub. No.: WO2009/061261
PCT Pub. Date: May 14, 2009

(65) Prior Publication Data
US 2010/0235704 A1    Sep. 16, 2010

Related U.S. Application Data

(60) Provisional application No. 60/985,714, filed on Nov. 6, 2007.

(51) Int. Cl.
*G06F 11/00* (2006.01)
(52) U.S. Cl.
USPC .............................. 714/748; 455/69; 455/13.4
(58) Field of Classification Search
None
See application file for complete search history.

(56) References Cited

U.S. PATENT DOCUMENTS

| 5,479,409 | A | 12/1995 | Dupuy et al. |
| 6,633,559 | B1 | 10/2003 | Asokan et al. |
| 7,363,010 | B2 * | 4/2008 | Oh et al. ................... 455/67.11 |
| 7,853,283 | B2 * | 12/2010 | Usuda et al. .................. 455/522 |

(Continued)

FOREIGN PATENT DOCUMENTS

| RU | 2 285 337 C2 | 10/2006 |
| WO | WO 00/74420 | 12/2000 |

(Continued)

OTHER PUBLICATIONS

International Search Report for PCT/SE2008/050647, mailed Apr. 1, 2009.

(Continued)

*Primary Examiner* — Christopher McCarthy
(74) *Attorney, Agent, or Firm* — Nixon & Vanderhye, P.C.

(57) ABSTRACT

The present invention relates to methods and arrangements in a wireless communication system, and in particular to uplink outer loop power control. A Node B identifies if a UE from which the Node B receives data is in a predetermined set of power challenged situations. The Node B transmits to the RNC an indication to hold the SIR target of the UE if the UE has been identified to be in a power challenged situation. As a consequence, the uplink outer loop power control (OLPC) procedure in the RNC will not change the SIR target of the UE. This implies that the output power level of the UE remains unchanged as long as the UE remains in the power challenged situation. Thus, user and network performance are improved in the wireless communication system.

28 Claims, 4 Drawing Sheets

(56) References Cited

U.S. PATENT DOCUMENTS

| | | | |
|---|---|---|---|
| 7,885,212 B2* | 2/2011 | Gerstenberger et al. | 370/278 |
| 8,116,351 B2* | 2/2012 | Koo et al. | 375/141 |
| 8,254,936 B2* | 8/2012 | Torsner et al. | 455/442 |
| 2006/0092887 A1* | 5/2006 | Iacono et al. | 370/335 |
| 2007/0042719 A1 | 2/2007 | Campo Camacho et al. | |
| 2008/0077837 A1* | 3/2008 | Lohr et al. | 714/748 |
| 2008/0084848 A1* | 4/2008 | Jard et al. | 370/332 |
| 2008/0287132 A1* | 11/2008 | Torsner et al. | 455/442 |
| 2009/0149134 A1* | 6/2009 | Gunnarsson et al. | 455/69 |
| 2009/0305712 A1* | 12/2009 | Franceschini et al. | 455/450 |
| 2010/0056169 A1* | 3/2010 | Koo et al. | 455/450 |
| 2010/0234041 A1* | 9/2010 | Larsson et al. | 455/452.2 |
| 2010/0238832 A1* | 9/2010 | Gunnarsson et al. | 370/252 |
| 2011/0255515 A1* | 10/2011 | Maeda et al. | 370/331 |
| 2012/0002610 A1* | 1/2012 | Widegren et al. | 370/328 |
| 2012/0099444 A1* | 4/2012 | Hakola et al. | 370/248 |

FOREIGN PATENT DOCUMENTS

| | | |
|---|---|---|
| WO | 02/47361 A2 | 6/2002 |
| WO | WO 2006/091137 A1 | 8/2006 |
| WO | 2008/140389 A1 | 11/2008 |

OTHER PUBLICATIONS

Written Opinion of the International Searching Authority for PCT/SE2008/050647, mailed Apr. 1, 2009.

English Translation of Russian Decision of Grant issued in Application 2010123006.

ETSI TS 125 427 V8.0.0, "Universal Mobile Telecommunications System (UMTS); UTRAN Iur/Iub Interface User Plane Protocol for DCH Data Streams" (3GPP TS 25.427 version 8.0.0, Release 8) (Oct. 2008).

3GPP TS 25 427 V7.5.0, "3rd Generation Partnership Project; Technical specification Group Radio Access Network; UTRAN Iur/Iub Interface User Plane Protocol for DCH Data Streams" (Release 7) (Sep. 2007).

3GPP TSG-RAN WG1 #52bis, Tdoc R1-081619, "EUL Coverage Enhancements", Shenzhen, China, Mar. 31-Apr. 4, 2008.

International Preliminary Report on Patentability mailed Feb. 19, 2010 in PCT Application No. PCT/SE2008/051118.

International Search Report mailed Jun. 30, 2009 in PCT Application No. PCT/SE2008/051118.

\* cited by examiner

METHODS AND ARRANGEMENTS FOR HOLDING TARGET RATIO FOR POWER LOOP IN A WIRELESS COMMUNICATION SYSTEM

This application is the U.S. national phase of International Application No. PCT/SE2008/051118 filed 2 Oct. 2008, which designated the U.S. and claims the benefit of U.S. Provisional Application No. 60/985,714 filed 6 Nov. 2007, the entire contents of each of which are hereby incorporated by reference.

TECHNICAL FIELD

The present invention relates to methods and arrangements in a wireless communication system, and in particular to uplink outer loop power control.

BACKGROUND

The 3rd Generation Partnership Project (3GPP) is a collaboration between groups of telecommunications associations, to make a globally applicable third generation mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture. The general architecture of a third generation mobile communication system 10 and its evolutions is illustrated in FIG. 1. The core network is the central part of a mobile network that provides various services to customers who are connected by the access network. The user equipment 20 is a mobile terminal by which a subscriber can access services offered by an operator's core network. The Radio Access Network (RAN) is the part of the network that is responsible for the radio transmission and control of the radio connection. A Radio Network Subsystem (RNS) consists of one Radio Network Controller (RNC) 40 and one or several base stations (BS) 30. Further, the Radio Network Controller (RNC) 40 controls radio resources and radio connectivity within a set of cells, as well as controlling the base stations within the RNS. A cell covers a geographical area and the radio coverage in a cell is provided by the base station handling radio transmission and reception within one or more cells.

In the 3GPP release 99, the RNC controls resources and user mobility. Resource control in this framework refers to admission control, congestion control, channel switching i.e. roughly changing the data rate of a connection. Furthermore, a dedicated connection is carried over a dedicated channel (DCH), which is realized as a Dedicated Physical Control Channel (DPCCH) and a Dedicated Physical Data Channel (DPDCH).

In enhanced 3G standards such as UMTS Release 6 specifications for Enhanced Uplink (EUL), the trend is to decentralize decision making and in particular the control over the short term data rate of the user connection. The uplink data is then allocated to E-DCH (enhanced DCH), which is realized as a DPCCH, which is continuous, and a E-DPCCH for data control and a E-DPDCH for data. The latter two are only allocated when there is uplink data to send. Hence, the base station uplink scheduler determines which transport formats each user can use over E-DPDCH. The RNC is however still responsible for admission and congestion control.

In W-CDMA (Wideband Code Division Multiple Access) the dedicated channels are power-controlled. In the uplink, this means that the base station measures the received DPCCH signal quality, SIR, and compares the measurements to a desired signal quality, SIR target. If the SIR is less than or equal to the SIR target, the base station signals the transmitter power control command 'up' to the UE to make it increase the power by a predefined step. If the SIR is higher than the SIR target, the base station signals the transmission power control command 'down' to the UE to make it decrease the power by a predefined step. The SIR target is regularly updated by the RNC via the DCH frame protocol procedures known as outer loop power control (OLPC). For DCH, the OLPC adjustments of SIR target are based on the Cyclic Redundancy Check Indicator (CRCI) indicating whether a data block was correctly decoded or not. For E-DCH, the hybrid automatic repeat request (HARQ) receiver handles multiple transmissions of a data block, which means that it is instead the number of HARQ retransmissions that are of interest. The number of HARQ retransmissions is sent over the DCH frame protocol procedures as well together with the data blocks. The number of HARQ retransmissions is coded by four bits in a "number of HARQ retransmissions" field in the DCH frame protocol, wherein value 0-11 indicates the number of HARQ retransmissions, value 12 indicates 12 or more HARQ retransmissions and value 15 indicates that the number of HARQ retransmissions is unknown. When the RNC receives a correctly decoded data block together with the value indicating the number of retransmissions, the latter value is compared to value of a target number of retransmissions. If the number of retransmissions exceeds the target number of retransmissions, the OLPC increases SIR target by a predefined step A, and if the number of retransmissions is lower or equal to the target number of retransmissions the OLPC decreases the SIR target by a predefined step B. The steps A and B are directly proportional to a configurable step size, and related to a configurable probability that the number of retransmissions exceeds the target number of retransmissions.

Moreover, when the number of retransmissions reaches a predefined limit, the base station signals HARQ error to the RNC according to the DCH frame protocol. In that signaled frame, the value of the number of retransmissions when the HARQ error occurred should also be indicated.

SUMMARY

The uplink OLPC resides in the RNC and the RNC is unaware of the actual uplink situation in the base station i.e. the Node B. For example, a high number of HARQ retransmissions could be due to power limitation in the UE, in which case the action of increasing the SIR target only worsens the situation. In another example the Node B employs interference cancellation which temporarily could be less efficient than normal. The high number of retransmissions causes the SIR target to increase which is unnecessary whether interference cancellation algorithm has recovered.

The object of the present invention is to improve network and user performance in a wireless communication system.

The object is achieved by identifying in the base station if the UE is in at least one of a set of predetermined UE power challenged situations when the base station receives uplink data from a UE. An indication to hold the SIR target of the UE is set by the base station if the UE has been identified to be in at least one of a set of predetermined UE power challenged situations. Further, the base station signals the indication to the radio network controlling node comprised in the wireless communication system. The radio network controlling node received the indication and holds the SIR target of the UE.

According to a first aspect of the present invention a method for a network node is provided. In the method the network node receives uplink data from at least one UE and identifies whether the at least one UE is in at least one of a set of predetermined UE power challenged situations. The network node sets an indication to hold a SIR target of the at least one UE if the at least one UE has been identified to be in at least one of a set of predetermined UE power challenged situations. Moreover, the network node signals the indication to a radio network controlling node comprised in the wireless communication system.

According to a second aspect of the present invention a network node is provided. The network node comprises a receiver for receiving uplink data from at least one UE and means for identifying whether the at least one UE is in at least one of a set of predetermined UE power challenged situations. Furthermore, the network node comprises means for setting an indication to hold a SIR target of the at least one UE if the at least one UE has been identified to be in at least one of a set of predetermined UE power challenged situations. The network node further comprises a transmitter for signaling the indication to a radio network controlling node comprised in the wireless communication system.

According to a third aspect of the present invention a method in a radio network controlling node is provided. In the method the radio network controlling node receives from a network node data associated with at least one UE and an indication associated with the at least one UE to hold a SIR target of the at least one UE if the at least one UE has been identified to be in at least one of a set of predetermined UE power challenged situations. Further, the radio network controlling node holds the SIR target of the at least one UE if indicated in the indication.

According to a fourth aspect of the present invention a radio network controlling node is provided. The radio network controlling node comprises a receiver for receiving from a network node data associated with at least one UE and an indication associated with the at least one UE to hold a SIR target of the at least one UE if the at least one UE has been identified to be in at least one of a set of predetermined UE power challenged situations. Moreover, the radio network controlling node comprises means for holding the SIR target of the at least one UE if indicated in the indication.

An advantage with embodiments of the present invention is that it provides a method to inform the RNC to hold the SIR target of a UE when the Node B has identified a situation in which changing the output power of the UE would worsen the situation.

Another advantage with the embodiments of the present invention is that user performance is improved as an increase of the output power level is avoided when the UE is power limited.

A further advantage with the embodiments of the present invention is that unnecessary increases of output power of the UE are avoided.

A further advantage with the embodiments of the present invention is that valuable uplink radio resources are saved.

Yet another advantage is that the embodiments of the present invention reduce power rushes in the communication system.

Yet another advantage is that instability situations take less time to resolve.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
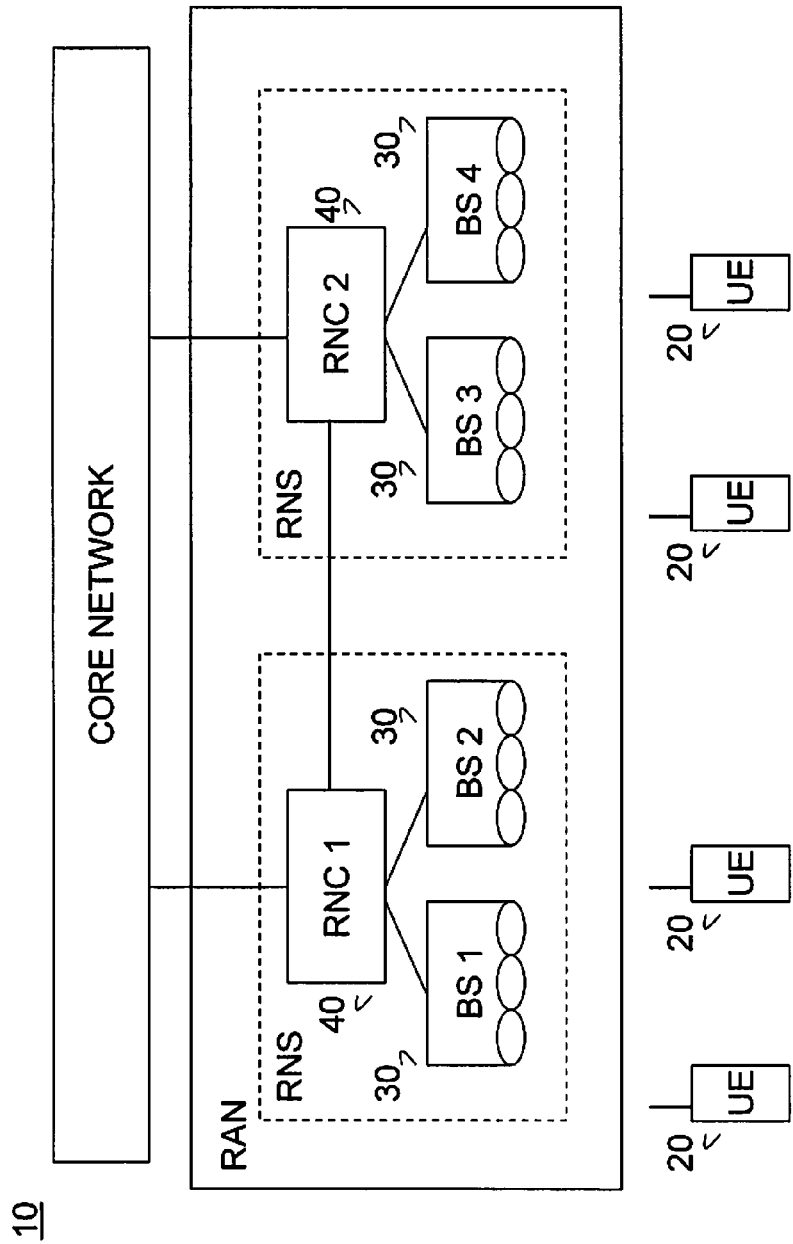
FIG. 1 shows the architecture of a radio access network in accordance with the present invention.

The present invention relates to methods and arrangements for data transmission utilizing a hybrid automatic repeat request protocol in a wireless communication system. The architecture of such a communication system is illustrated in the above-described FIG. 1.

According to one embodiment of the present invention, the network node 30, e.g. a Node B, identifies if a UE 20 from which the Node B 30 receives data is in a power challenged situation. The Node B 30 transmits to the radio network controlling node, e.g. a RNC 40, an indication to hold the SIR target of the UE 20 if the UE 20 has been identified to be in a power challenged situation. As a consequence thereof the uplink OLPC in the RNC 40 will not change the SIR target of the UE 20. Moreover, this implies that the output power level of the UE 20 remains unchanged as long as the UE remains in the power challenged situation.

Figure 2:
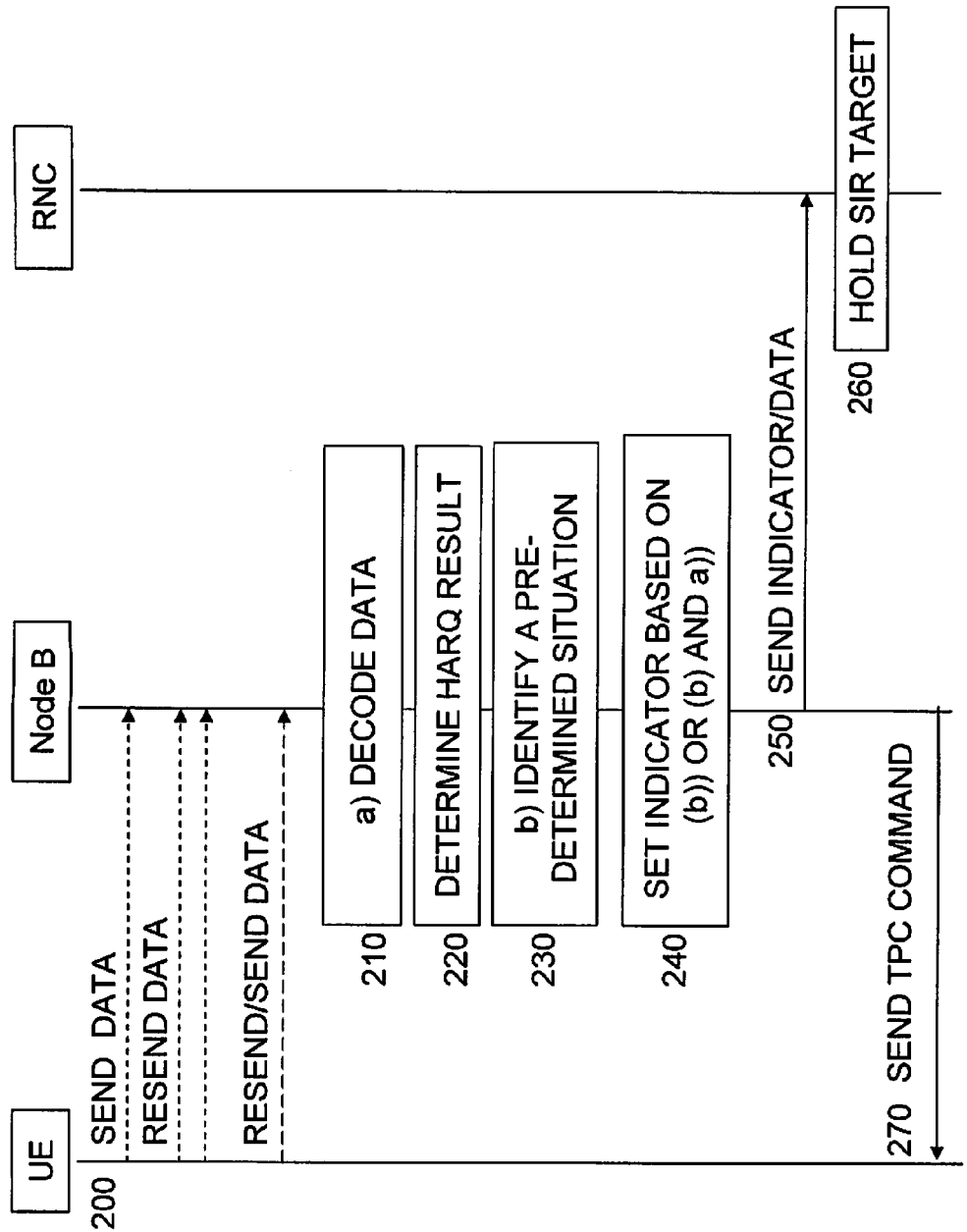
FIG. 2 is a flowchart illustrating the method of the present invention.

Turning now to FIG. 2 showing a flowchart of a method according to an embodiment of the present invention.

In the wireless communication system, the UE 20 transmits uplink data 200 to the Node B 30, whereupon the Node B 30 receives the uplink data in a HARQ receiver. The HARQ receiver decodes 210 the received uplink data using a HARQ protocol and the number of HARQ retransmissions of the uplink data is determined 220. In a further step the Node B 30 identifies if the UE 20 is in a power challenged situation 230 in which OLPC reactions should be avoided. If Node B 30 has identified that the UE 20 is in a power challenged situation the Node B 30 sets an indication 240 to hold a SIR target of the UE 20. Furthermore, the indication is implemented as an indicator which the Node B signals 250 to the RNC 40 comprised in the wireless communication system. The indication is received in the RNC 40 which holds the SIR target of the UE 20 during the following OLPC procedure.

According to one alternative the indication and the uplink data are sent together in the DCH frame protocol to the RNC 40. According to another alternative the indicator is sent using a dedicated field or information element of the DCH frame protocol.

In yet another alternative, the RNC 40 is made aware of the situation by using the DCH frame protocol and in particular the "number of HARQ retransmissions" (NHR) field, specified in the DCH frame protocol.

In a further alternative the NHR field in the DCH frame protocol is always set to the value 14 if the Node B 30 has identified a UE power challenged situation. Thus, both for correctly decoded data and for HARQ error the NHR field is set to value 14. Consequently, the RNC 40 holds the SIR target of the UE 20 during the OLPC procedure.

It should be pointed out that value 13 also could be used instead of value 14 to indicate the Node B 30 has identified a UE power challenged situation.

In another embodiment of the present invention, when the uplink data has been correctly decoded by the HARQ receiver, the NHR field in the DCH frame protocol is set to value 14 (or 13) when the number of retransmissions exceeds 0. Thus, the NHR field is set to indicate hold the SIR target of the UE 20. In addition, when the number of retransmissions is zero, i.e. when the first transmission was correctly decoded, this is stated in the NHR field in the DCH frame protocol signaled to the RNC. Moreover, when HARQ errors occur, the NHR field is set to the number of retransmissions required, when the HARQ error occurred. Consequently, the OLPC procedure in the RNC will cause the SIR target to decrease the SIR target of the UE 20 in case of no retransmissions was needed in the uplink and to increase the SIR target in case of HARQ error. Thus, the OLPC procedure will have a dead zone in which the SIR target remain fixed, but is adjusted at the two extreme cases no retransmission and HARQ error, respectively.

In yet another embodiment of the present invention, the indication to hold outer loop power control is implemented as one indicator to start holding the OLPC, and one indicator to stop holding OLPC.

In the following a number of embodiments of the present invention describe a set of power challenged situations identified by the Node B. The different situations may be comprised in a set of predetermined UE power challenged situations which may be identified by the Node B. The Node B may establish that the UE 20 is in a power challenged situation in a periodically repeated procedure.

Firstly, a predetermined situation may be when the UE 20 is power limited. The UE 20 will require more retransmissions due to the power shortage. Furthermore, if the OLPC procedure would not hold the SIR target but instead increase the SIR target, i.e. cause the UE 20 to increase its power level; it would only worsen the situation.

Secondly, a predetermined situation may be when the Node B 30 employs interference cancellation, which temporarily could be less efficient than normally, e.g. due to channel estimation convergence. If the resulting high number of retransmissions in such a situation would not cause the OLPC procedure to hold the SIR target, it would cause the UE 20 to increase its power level, which is not needed when the interference cancellation algorithm has recovered.

Thirdly, a predetermined situation may be when the Node B 30 has detected instability and wish to avoid power rushes by holding the uplink power control while solving the instability. The detection of instability by the Node B 30 may be based on that the estimated uplink noise rise has exceeded a predefined threshold or that the SIR error variance has exceeded a predefined threshold. It should be noted that instability indicators could be utilized in connection with the detection of instability in order to reduce false alarms and to make the detection more reliable.

Inner loop power control in the uplink is the ability of the UE 20 to adjust its output power in accordance with one or more TPC (transmit power control) commands received in the downlink 270. When an instability situation has been detected the inner loop power control could be held by sending alternating TPC commands to the UE 20: up-down-up-down i.e. TPC command toggling. This could be applied to all uplink connections in a cell or a subset of the uplink connections in the cell. However, it is well known that TPC command toggling may cause problems in soft handover i.e. a UE 20 is simultaneously connected to two or more cells during a call. Consequently, the toggling may only be used for UEs that are not in soft handover. For UEs in soft handover it could be avoided by transmitting any TPC commands from the cell that wishes to hold the UEs output power level and rely on the TPC commands reliability judgment applied by the UE 20 when it is in soft handover. In one embodiment of the present invention a TPC command is introduced to signal "hold the output power" to the UE 20.

Moreover, if there are several UEs contributing to the power rush in a detected instability situation the TCP commands up-down-up-down signaled to the various UEs should be staggered as far as possible so that approximately half the UEs receive an "up" command and the other half receive a "down" command.

As an alternative embodiment, there may be a configurable limited output power increase operation where the base station sends specific TPC command patterns to the UE, both considering the variations in the radio link quality and limited output power increase conditions. Moreover, the configurable limited output power increase operation restricts the number of power adjustments upwards relative the total number of power control commands over a predetermined number of control periods or slots. For example, the max number of "up" commands per 30 commands could be configurable to avoid the worst case situation of 30 "up" commands, while still enabling some output power increases for the UEs in need to avoid jeopardizing coverage. By restricting the number of "up" commands to less than half of the considered commands, in this case 30, the configurable limited output power increase operation corresponds to an output power decrease operation for the UEs, which could further help resolving a congestion situation.

Figure 3:
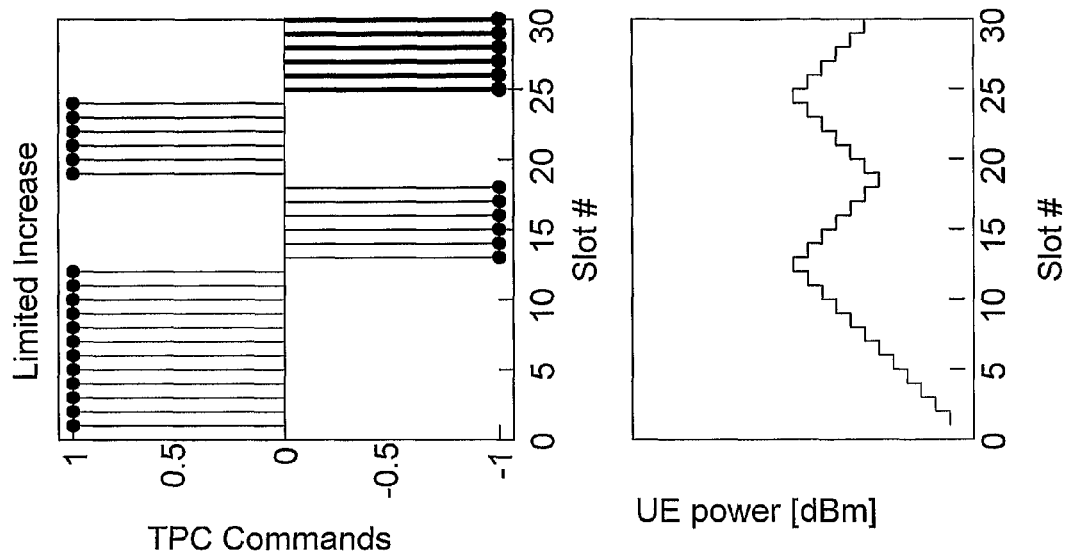
FIG. 3 illustrates the limited output power increase operation at a base station for a particular mobile in accordance with the present invention.
Figure 3:
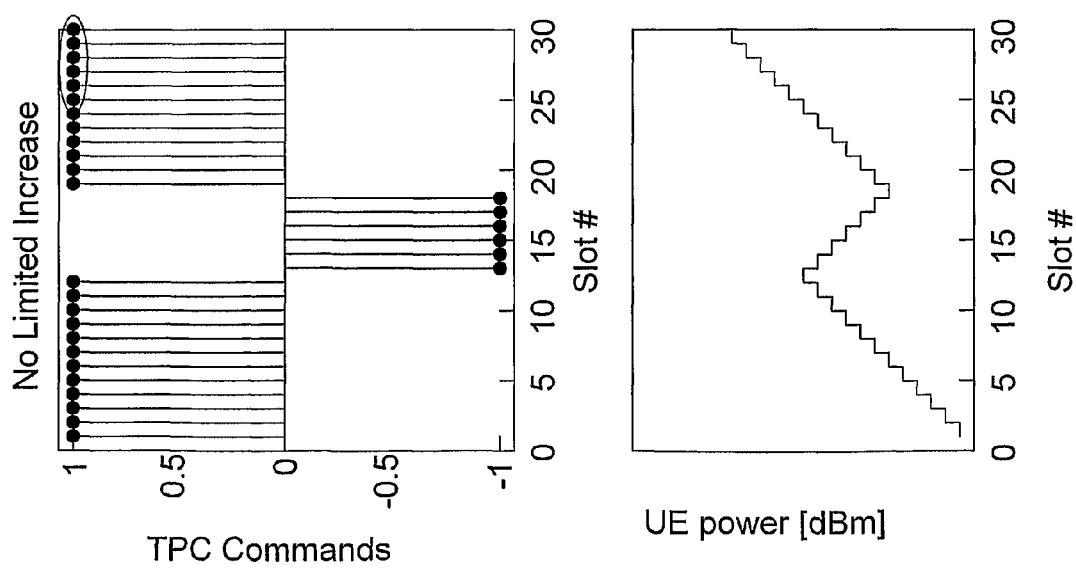

As illustrated by the example in FIG. 3, where the limited output power increase method has configured max 18 "up" commands for a particular UE. Considering only the comparison between estimated SIR and SIR target, then the base station would issue 24 "up" commands out of 30 commands as seen in the two left plots. With the limited increase function, the last six commands will instead be "down" commands to comply with the configuration as illustrated by the right plots.

If the detection of instability by the Node B 30 is based on that the SIR error variance has exceeded a predefined threshold, the SIR error could be used to identify which UEs' SIR target to hold.

When the instability is resolved, the number of retransmissions is again signaled over the DCH frame protocol.

Figure 4:
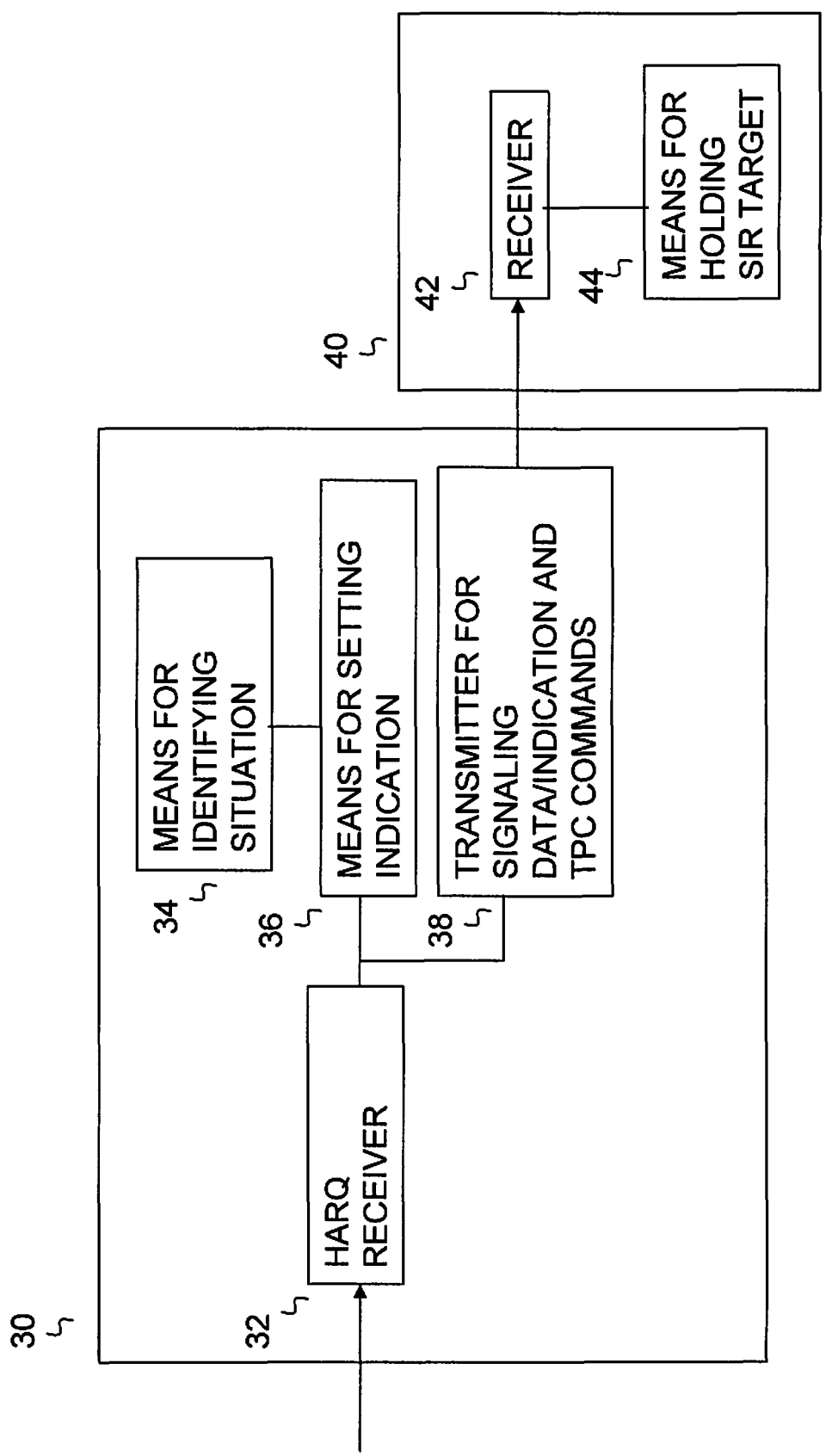
FIG. 4 shows a block diagram schematically illustrating a network node and a radio network controlling node in accordance with the present invention.

As shown in FIG. 4 the Node B 30 comprises a HARQ receiver for receiving uplink data from the UE 20. The HARQ receiver comprises means for decoding the uplink data using the HARQ protocol. The HARQ receiver further comprises means for determining 32 a result of the decoding of the uplink data. The Node B 30 comprises means for identifying 34 if the UE 20 is in a predetermined UE power challenged situation and means for setting 36 the indication to hold the SIR target of the UE 20 based on if the UE 20 has been identified to be in a UE power challenged situation. The Node B 30 further comprises a transmitter adapted for signaling 38 the indication and the uplink data to the RNC 40.

Further as shown in FIG. 4, the RNC 40 comprises a receiver 42 for receiving from the Node B 30 data associated with the UE 20 and the indication associated with the UE 20 to hold the SIR target of the UE if the UE has been identified to be in a predetermined UE power challenged situation. Further the RNC 40 comprises means for holding 44 the SIR target of the UE 20 if indicated in the received indication.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method in a network node comprised in a wireless communication system, wherein said network node is adapted to enable wireless communication with at least one user equipment, the method comprises:
   receiving uplink data from said at least one user equipment;
   identifying whether said at least one user equipment is in at least one of a set of predetermined user equipment power challenged situations;
   setting an indication to hold a signal to interference ratio, SIR, target of said at least one user equipment if said at least one user equipment has been identified to be in at least one of a set of predetermined user equipment power challenged situations;
   signaling said indication together with said uplink data to a radio network controlling node comprised in said wireless communication system, wherein said indication is coded in a dedicated channel, DCH, frame protocol; and
   wherein said network node is adapted to utilize hybrid automatic repeat request, HARQ, for error control;
   wherein said indication is sent in a fixed part of said DCH frame protocol.

2. The method according to claim 1, wherein the method comprises;
   decoding the received uplink data using a HARQ protocol; and
   determining a result of said decoding of the received uplink data; and wherein said indication to hold the SIR target of said at least one user equipment is in addition based on the determined result of said decoding of the received uplink data.

3. The method according to claim 1, wherein said set of predetermined user equipment power challenged situations comprises a situation wherein said at least one user equipment is power limited.

4. The method according to claim 1, wherein said set of predetermined user equipment power challenged situations comprises a situation wherein said at least one user equipment is involved in an interference cancellation process.

5. The method according to claim 4, further comprising signaling to said at least one user equipment to hold an inner loop power control.

6. The method according to claim 5, wherein said signaling to said at least one user equipment to hold an inner loop power control is performed by signaling alternating power control commands.

7. The method according to claim 4, further comprising signaling to said at least one user equipment a limited output power increase operation, wherein said limited output power increase operation restricts the number of power adjustments upwards relative the total number of power control commands over a predetermined number of control periods or slots.

8. The method according to claim 1, wherein said set of predetermined user equipment power challenged situations comprises a situation wherein said at least one user equipment is involved in a detected instability situation.

9. The method according to claim 8, wherein said detected instability situation is based on that an estimated uplink noise rise has exceeded a predefined threshold.

10. The method according to claim 8, wherein said detected instability situation is based on that an SIR error variance has exceeded a predefined threshold.

11. The method according to claim 1, wherein said DCH frame protocol comprises a "number of HARQ retransmission" field and said indication is coded in said number of HARQ retransmission field.

12. A network node configured to be connected to a wireless communication system, said network node is adapted to enable wireless communication with at least one user equipment, the network node comprises:
   a receiver for receiving uplink data from said at least one user equipment;
   means for identifying whether said at least one user equipment is in at least one of a set of predetermined user equipment power challenged situations;
   means for setting an indication to hold a SIR target of said at least one user equipment if said at least one user equipment has been identified to be in at least one of a set of predetermined user equipment power challenged situations;
   a transmitter for signaling said indication together with said uplink data to a radio network controlling node comprised in said wireless communication system, wherein said indication is coded in a dedicated channel, DCH, frame protocol; and wherein said network node is adapted to utilize hybrid automatic repeat request, HARQ, for error control;
   wherein said indication is configured to be sent in a fixed part or said DCH frame protocol.

13. The network node according to claim 12, comprising
   a decoder for decoding the received uplink data using a HARQ protocol;
   means for determining a result of said decoding of the received uplink data; and wherein said indication to hold the SIR target of said user equipment is in addition based on the determined result of said decoding of the received uplink data.

14. The network node according to claim 12, wherein said set of predetermined user equipment power challenged situations comprises a situation wherein said at least one user equipment is power limited.

15. The network node according to claim 12, wherein said set of predetermined user equipment power challenged situations comprises a situation wherein said at least one user equipment is involved in an interference cancellation process.

16. The network node according to claim 15, comprising
   a transmitter for signaling to said at least one user equipment to hold an inner loop power control.

17. The network node according to claim 16, wherein signaling to said at least one user equipment to hold an inner loop power control is performed by signaling alternating power control commands.

18. The network node according to claim 15, comprising a transmitter for signaling to said at least one user equipment a limited output power increase operation, wherein said limited output power increase operation restricts the number of power adjustments upwards relative the total number of power control commands over a predetermined number of control periods or slots.

19. The network node according to claim 12, wherein said set of predetermined user equipment power challenged situations comprises a situation wherein said at least one user equipment is involved in a detected instability situation.

20. The network node according to claim 19, wherein said detected
instability situation is based on that an estimated uplink noise rise has exceeded a predefined threshold.

21. The network node according to claim 19, wherein said detected instability situation is based on that an SIR error variance has exceeded a predefined threshold.

22. The network node according to claim 12, wherein said DCH frame protocol comprises a "number of HARQ retransmission" field and said indication is coded in said number of HARQ retransmission field.

23. A method in a radio network controlling node comprised in a wireless communication system, wherein the radio network controlling node is connected to a network node which enables wireless communication with at least one user equipment, the method comprising:
receiving from said network node uplink data associated with said at least one user equipment and an indication associated with said at least one user equipment to hold a SIR target of said at least one user equipment if said at least one user equipment has been identified to be in at least one of a set of predetermined user equipment power challenged situations, wherein said indication is coded in a dedicated channel, DCH, frame protocol;
holding said SIR target of said at least one user equipment if indicated in said indication; and wherein said network node is adapted to utilize hybrid automatic repeat request, HARQ, for error control;
wherein said indication is sent in a fixed part of said DCH frame protocol.

24. The method according to claim 23, wherein said DCH frame protocol comprises a "number of HARQ retransmission" field and said indication is coded in said number of HARQ retransmission field.

25. A radio network controlling node configured to be connected to a wireless communication system, wherein the radio network controlling node is configured to be connected to a network node which enables wireless communication with at least one user equipment, the radio network controlling node comprises
a receiver for receiving from said network node uplink data associated with said at least one user equipment and an indication associated with said at least one user equipment to hold a SIR target of said at least one user equipment if said at least one user equipment has been identified to be in at least one of a set of predetermined user equipment power challenged situations, wherein said indication is coded in a dedicated channel, DCH, frame protocol;
means for holding the SIR target of said at least one user equipment if indicated in said indication; and wherein said network node is adapted to utilize hybrid automatic repeat request, HARQ, for error control;
wherein said indication is configured to be sent in a fixed part of said DCH frame protocol.

26. The radio network controlling node according to claim 25, wherein said DCH frame protocol comprises a "number of HARQ retransmission" field and said indication is coded in said number of HARQ retransmission field.

27. A method in a network node comprised in a wireless communication system, wherein said network node is adapted to enable wireless communication with at least one user equipment, the method comprises:
receiving uplink data from said at least one user equipment;
identifying whether said at least one user equipment is in at least one of a set of predetermined user equipment power challenged situations, wherein said set of predetermined user equipment power challenged situations comprises a situation wherein said at least one user equipment is involved in an interference cancellation process;
setting an indication to hold a signal to interference ratio, SIR, target of said at least one user equipment if said at least one user equipment has been identified to be in at least one of a set of predetermined user equipment power challenged situations;
signaling said indication together with said uplink data to a radio network controlling node comprised in said wireless communication system, wherein said indication is coded in a dedicated channel, DCH, frame protocol; and wherein said network node is adapted to utilize hybrid automatic repeat request, HARQ, for error control;
signaling to said at least one user equipment a limited output power increase operation, wherein said limited output power increase operation restricts the number of power adjustments upwards relative the total number of power control commands over a predetermined number of control periods or slots.

28. A network node configured to be connected to a wireless communication system, said network node is adapted to enable wireless communication with at least one user equipment, the network node comprises:
a receiver for receiving uplink data from said at least one user equipment;
means for identifying whether said at least one user equipment is in at least one of a set of predetermined user equipment power challenged situations, wherein said set of predetermined user equipment power challenged situations comprises a situation wherein said at least one user equipment is involved in an interference cancellation process;
means for setting an indication to hold a SIR target of said at least one user equipment if said at least one user equipment has been identified to be in at least one of a set of predetermined user equipment power challenged situations; a transmitter for signaling said indication together with said uplink data to a radio network controlling node comprised in said wireless communication system, wherein said indication is coded in a dedicated channel, DCH, frame protocol; and wherein said network node is adapted to utilize hybrid automatic repeat request, HARQ, for error control;
a transmitter for signaling to said at least one user equipment a limited output power increase operation, wherein said limited output power increase operation restricts the number of power adjustments upwards relative the total number of power control commands over a predetermined number of control periods or slots.

* * * * *

UNITED STATES PATENT AND TRADEMARK OFFICE
CERTIFICATE OF CORRECTION

PATENT NO. : 8,583,974 B2  
APPLICATION NO. : 12/741735  
DATED : November 12, 2013  
INVENTOR(S) : Gunnarsson et al.

Page 1 of 1

It is certified that error appears in the above-identified patent and that said Letters Patent is hereby corrected as shown below:

In the Specifications

In Column 6, Line 23, delete "TCP" and insert -- TPC --, therefor.

In the Claims

In Column 9, Line 52, in Claim 25, delete "comprising" and insert -- comprising: --, therefor.

Signed and Sealed this
Sixth Day of May, 2014

Michelle K. Lee
*Deputy Director of the United States Patent and Trademark Office*